Aug. 19, 1969   N. A. POLESCHUK   3,462,570
VEHICLE DIRECTION SIGNALING AND HAZARD
WARNING SWITCHING APPARATUS
Filed Aug. 15, 1966   3 Sheets-Sheet 1
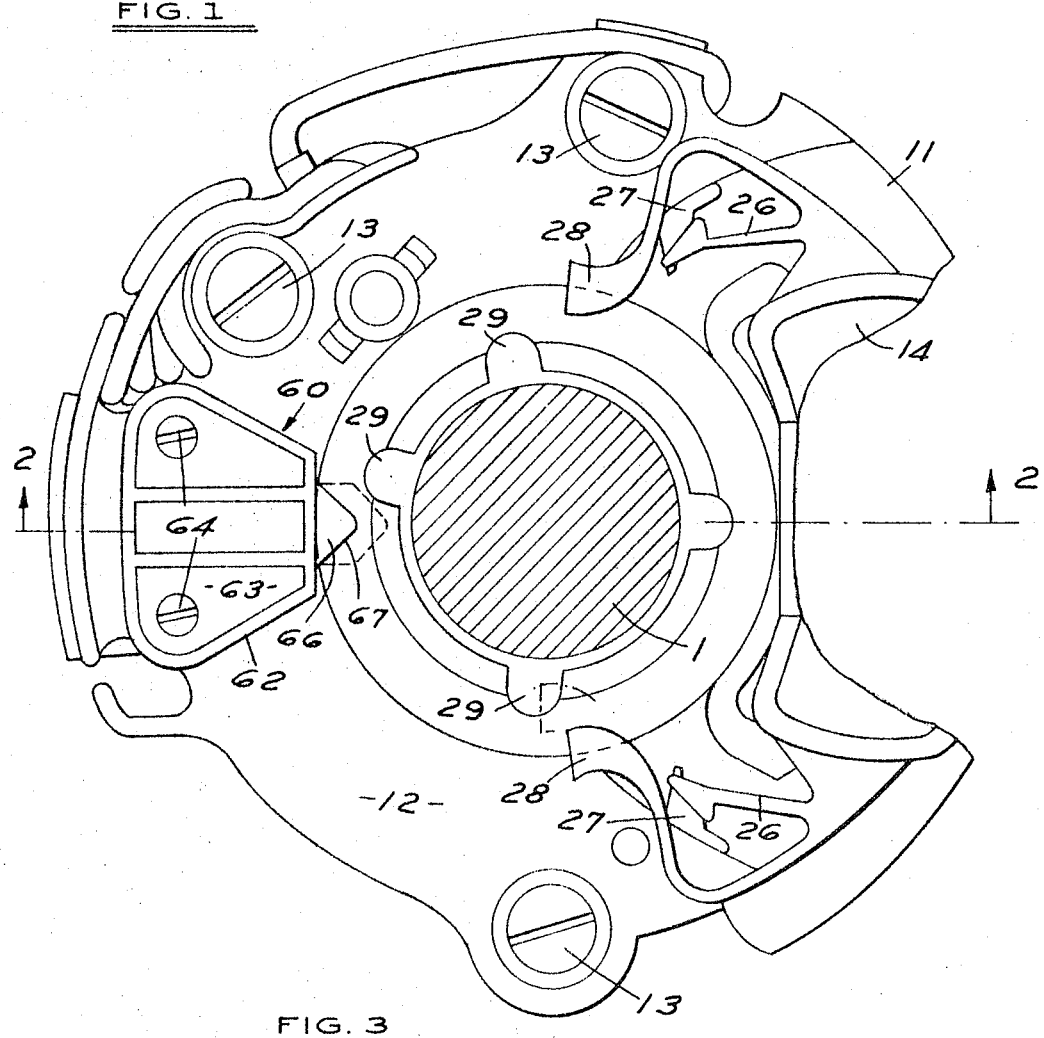
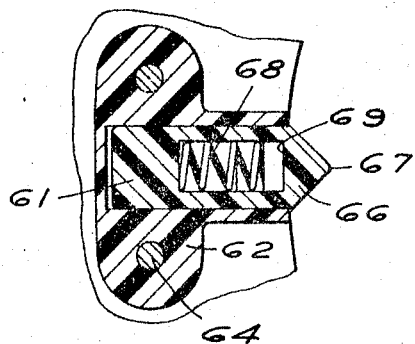
INVENTOR
NICHOLAS A. POLESHUK
BY
Learman & McCulloch
ATTORNEYS

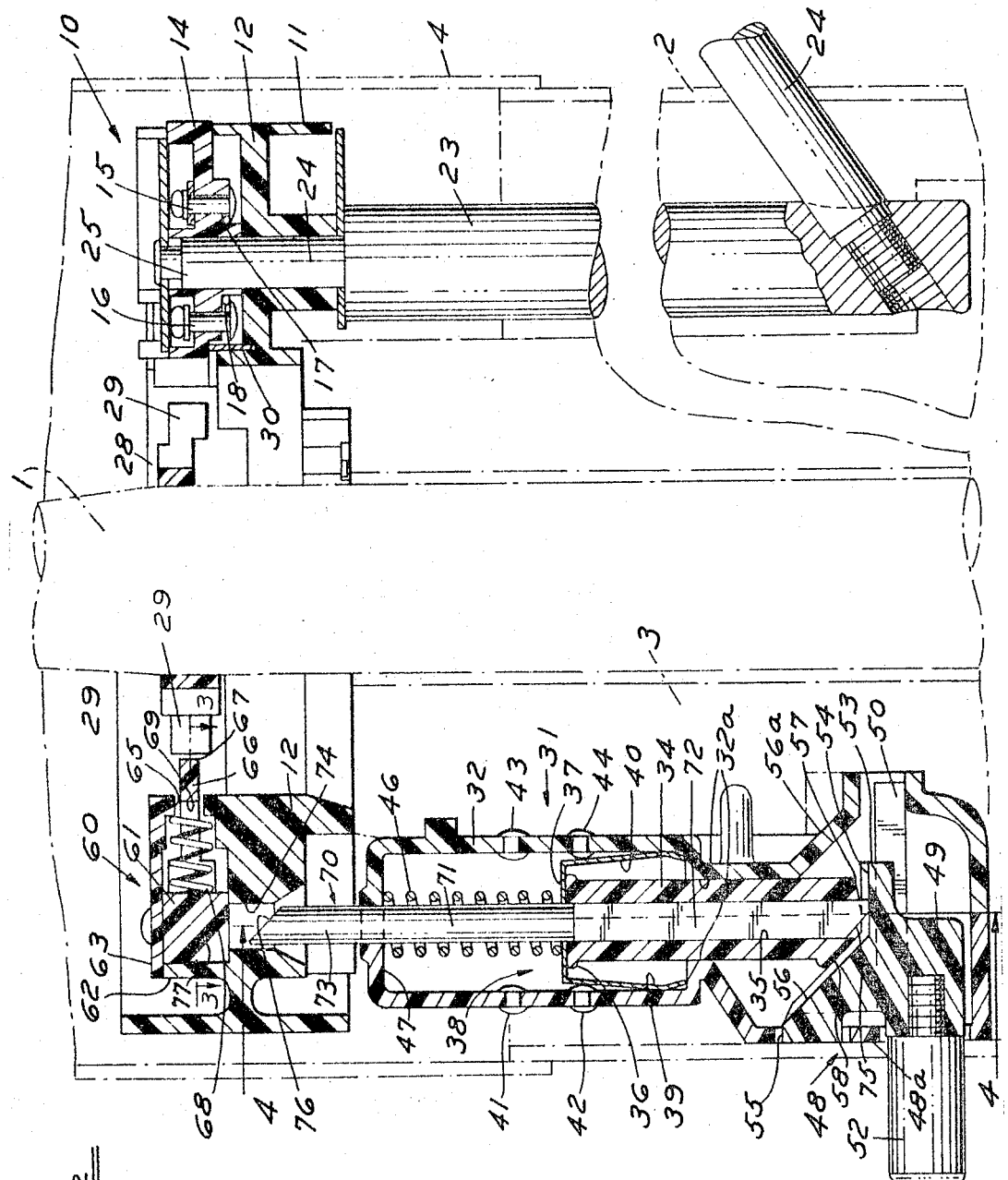

United States Patent Office 3,462,570
Patented Aug. 19, 1969

3,462,570
VEHICLE DIRECTION SIGNALING AND HAZARD
WARNING SWITCHING APPARATUS
Nicholas A. Poleschuk, Farmington, Mich., assignor to
Boyne Products Inc., Detroit, Mich., a corporation of
Michigan
Filed Aug. 15, 1966, Ser. No. 572,540
Int. Cl. B60q 1/34, 1/48
U.S. Cl. 200—61.27                           17 Claims

ABSTRACT OF THE DISCLOSURE

A switch for use in a vehicle having rotatable steering means and left-hand and right-hand signaling indicators, the switch comprising an actuator movable toward and away from the axis of rotation of the steering means to effect displacement of an operator along a path parallel to the axis of rotation of the steering means for enabling and disabling simultaneous operation of the signaling means. A second actuating member is mounted for movement toward and away from the axis of rotation of the steering means and is displaceable upon engagement with a cam rotatable with the steering means to initiate movement of the operating member to a position in which the signaling means is disabled.

---

This invention relates to signaling apparatus for automotive vehicles having left-hand and right-hand signaling indicators operable to indicate selectively a left-hand or a right-hand turn, and more particularly the invention pertains to selectively manually or automatically cancelable apparatus for operating both the left-hand and the right-hand signaling devices simultaneously so as to enable the signaling indicators of a parked or a disabled vehicle to function as a hazard warning device to the drivers of approaching vehicles.

Apparatus of the general class to which the invention relates is disclosed in United States Letters Patent No. 3,235,837, granted Feb. 15, 1966, and to which reference may be had for a more detailed discussion of the purposes and advantages of hazard warning switching apparatus. Although the apparatus disclosed in the aforementioned patent functions admirably on most vehicles, there are certain types of vehicles for which the apparatus is unsuited. For example, some vehicles presently utilize or will utilize steering shafts which are capable of axial adjustment either intentionally or under impact. If apparatus of the kind disclosed in the aforementioned patent were incorporated with such an axially adjustable steering shaft, it would be necessary to provide an undesirable, axial slot in the housing in which the apparatus is mounted. Nevertheless, the selectively manual or automatic cancelation of the hazard warning apparatus disclosed in the aforementioned patent is a desirable characteristic to maintain, regardless of the axial adjustability of the steering shaft.

An object of this invention is to provide hazard warning signaling apparatus which is movable manually from a disabled position to an operating position in which it is capable of being canceled either automatically or manually, and which also is adapted for use in connection with either fixed length or adjustable length steering shaft assemblies.

Another object of the invention is to provide hazard warning signaling apparatus of the character described and which is independent of the direction signal operating means, but which is capable of utilizing the major portion of the direction signaling circuitry.

A further object of the invention is to provide hazard warning signaling apparatus which is automatically cancelable by the same canceling mechanism that is utilized to cancel the direction signaling devices.

Other objects and advantages of the invention will be pointed out specifically or will become apparent from the following description when it is considered in conjunction with the appended claims and the accompanying drawings, in which:

FIGURE 1 is a fragmentary, top plan view illustrating direction signaling apparatus, direction signal canceling apparatus and hazard warning switch apparatus constructed in accordance with the invention;

FIGURE 2 is a transverse sectional view taken on the line 2—2 of FIGURE 1 and illustrating the hazard warning switch apparatus in its inactive or disabled position;

FIGURE 3 is a sectional view taken on the line 3—3 of FIGURE 2;

Figure 6:
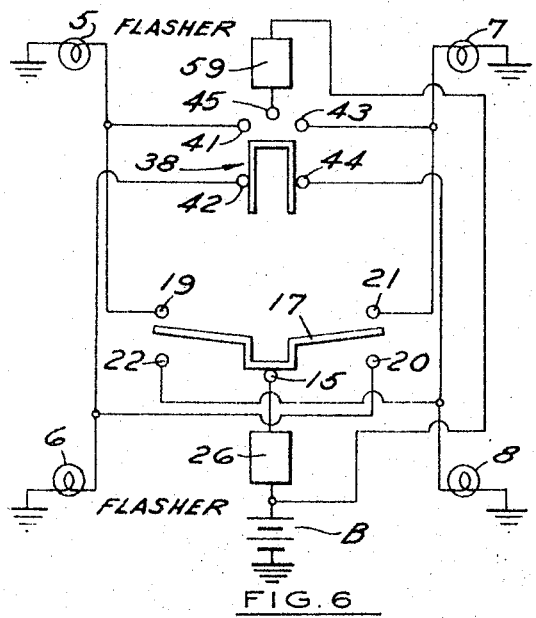
FIGURE 6 is schematic wiring diagram of a typical installation according to the invention.

Apparatus constructed in accordance with the invention is adapted for use in conjunction with a vehicle having an elongated steering shaft 1 which is rotatable about its longitudinal axis by means of a steering wheel (not shown). The shaft 1 is mounted within a tubular column 2 adjacent the upper end of which is secured by suitable means an annular support member 3. In telescoping relation with the column 2 is an annular housing 4 which is capable of telescoping axially of the column 2 in response to axial movement of the shaft 1.

The vehicle includes a left front signal lamp or indicator 5, a left rear signal lamp or indicator 6, a right front signal lamp or indicator 7 and a right rear signal lamp or indicator 8. The indicators 5–8 preferably constitute the left-hand and right-hand direction signaling indicators, but may be independent of the direction signaling indicators, if desired.

Apparatus constructed in accordance with the invention includes direction signal indicator actuating means designated generally by the reference character 10 and preferably corresponding to the apparatus shown in United States Letters Patent No. 3,239,619, granted Mar. 8, 1966. Briefly, however, the apparatus 10 comprises a casing 11 formed of insulating material and having an annular base member 12 which is secured to the support 3 by suitable screws 13 or the like. Atop the casing 11 is mounted an actuating member 14 formed of insulating material and to which is secured a pair of electrically conductive members 15 and 16 to which are connected conductive arms 17 and 18, respectively, which are adapted to engage and disengage fixed contact 19, 20, 21, and 22 mounted in the casing 11 and connected to the indicators 5, 6, 7, and 8, respectively. An actuating shaft 23 is journaled in the support 3 and has a reduced, cylindrical portion 24 which extends through the casing 11 and terminates in a flattened end portion 5 that extends through a correspondingly shaped opening in the actuator 14 so as to be capable of imparting rocking movements to the actuator 14 from a neutral position to either one of two operating positions on opposite sides of the neutral position. An operating handle 24 is connected to the shaft 23 and extends through an opening formed in the column 2 for manipulation by the vehicle driver.

In the position shown in FIGURE 1, the actuator 14 is in its neutral position, and in which none of the signal indicators 5–8 is operative. If the actuator 14 is rocked counterclockwise from the position shown in FIGURE 1, however, the conductive arm 17 (FIGURE 6) will be rocked so as to bridge the contacts 21 and 22, thereby connecting the signal indicators 7 and 8 to the vehicle battery B via a flasher unit 26, and causing simultaneous flashing of the right front and right rear indicators 7 and 8, respectively. The indicators 5 and 6, however, will remain inoperative. Should the actuator 14 be rocked clockwise from the position shown in FIGURE 1, the conductive arm 17 will bridge the contacts 19 and 20 so as to effect simultaneous flashing of the left front and left rear indicators 5 and 6, and in this case the indictors 7 and 8 will be inoperative.

At each end of the actuator 14 is a flexible latch pawl arm 26 which is adapted to move into latching engagement with a latch abutment 27 supported on the casing 11 so as to maintain the actuator 14 releasably latched in a selected one of its two operating positions. The construction and operation of the parts 26 and 27 are disclosed fully in co-pending application Ser. No. 557,676, filed June 15, 1966.

At each end of the actuator 14 is a flexible canceling or return finger 28 which projects toward the steering shaft 1. Mounted on the shaft 1 or on the base 12 in the manner disclosed in co-pending application Ser. No. 558,-433, filed June 17, 1966, is a plurality of radially projecting cam lobes 29 which move in a path in response to rotation of the shaft 1. The fingers 28 lie radially beyond the path or rotation of the cam when the actuator 14 is in its neutral position, but when the latter is rocked to one of its operating positions, one or the other of the fingers 28 will be projected into the path of rotation of the cams 29 as is indicated in chain lines in FIGURE 1. When the finger 28 is in the position indicated in chain lines in FIGURE 1, clockwise rotation of the shaft 1 will cause the cams 29 to deflect the projected finger 28 away from the latch pawl 26, but counterclockwise rotation of the shaft 1 will cause one of the cams 29 to abut the finger 28 and urge it into engagement with the associated pawl 26. Further counterclockwise rotation of the shaft 1 will cause the cams 29 to deflect the projected finger 28 away from the latch pawl 26, but counterclockwise rotation of the shaft 1 will cause one of the cams 29 to abut the finger 28 and urge it into engagement with the associated pawl 26. Further counterclockwise rotation of the shaft 1 will cause the cam 29 to displace the finger 28 sufficiently far to effect disengagement of the associated pawl 26 and its latch abutment 27, whereupon a leaf spring 30 (FIGURE 2) interposed and reacting between the members 12 and 14 will restore the actuator 14 to its neutral position and effect cancelation of the energized direction signal lamps.

Hazard warning apparatus constructed in accordance with the invention is designated generally by the reference character 31 and comprises hollow casing 32 formed of insulating material and which is mounted by suitable screws 33 or the like on the support 3 within the column 2. The casing 32 is elongated and is mounted so as to parallel the longitudinal axis of the steering shaft 1.

Reciprocably mounted within the casing 32 by means of guide walls 32a is a non-conductive operator or carrier 34 having substantially square bore 35 extending therethrough. One end of the operator 34 terminates in a flanged seat 36 on which is seated the web 37 of a generally U-shaped, electrically conductive switching member 38 having a plurality of legs or flanges 39 and 40 at opposite sides of the web 37. The switching member 38 preferably corresponds to the construction disclosed in co-pending application Ser. No. 561,620, filed June 29, 1966, and is adapted to engage and disengage a plurality of fixed contacts 41, 42, 43, 44 and 45 (FIGURE 6) mounted in the casing 32. The carrier 34 and the switch member 38 are capable of back and forth movements in the casing 32 and constantly are urged to the position shown in FIGURE 2 by a compression spring 46 which bears against the web 37 and against an end wall 47 of the casing. In the position of the members 34 and 38 shown in FIGURES 2 and 6, the contacts 43, 44, and 45 are disengaged from the switching member 38.

Figure 5:
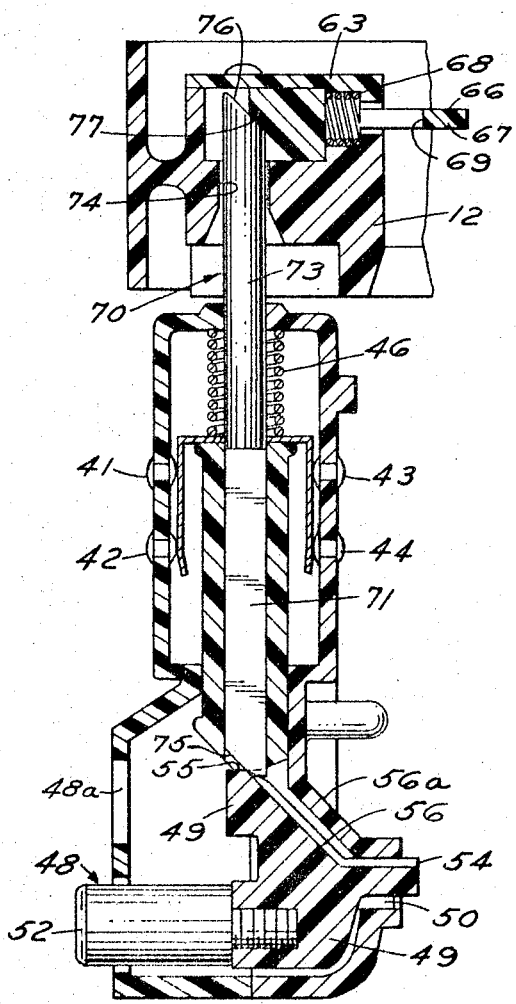
FIGURE 5 is a view similar to FIGURE 2, but illustrating the apparatus in its operating condition.
Figure 4:
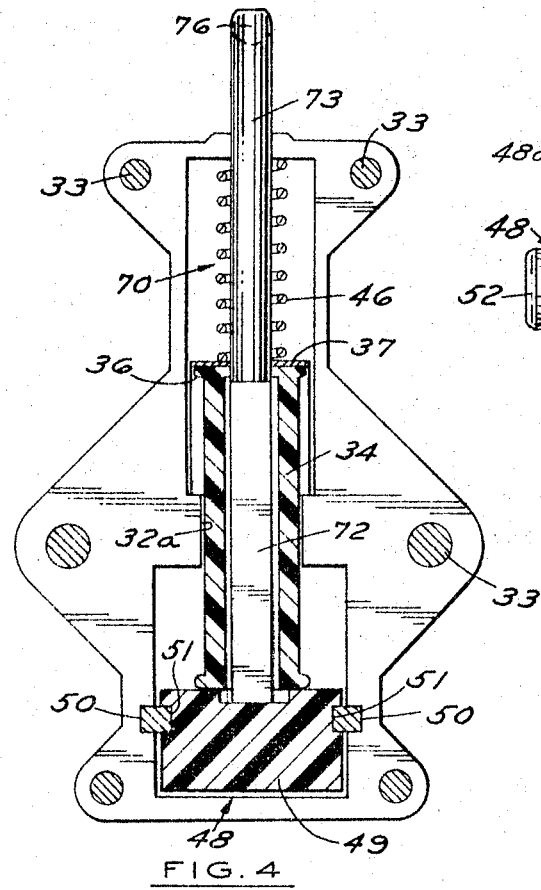
FIGURE 4 is a sectional view taken on the line 4—4 of FIGURE 2.

Actuating means 48 is provided to effect movement of the operating member 34 from the position shown in FIGURE 2 to the position shown in FIGURE 5. The actuating means 48 comprises a block or body 49 reciprocably mounted in the casing 31 by means of a pair of rails 50 for back and forth movements laterally of the path of the member 34, i.e., radially of the axis of rotation of the shaft 1. The rails 50 are accommodated in grooves formed in the casing 31 and in correspondingly located grooves 51 formed in the block 49. A projection or stud 52 is secured to the body 49 and projects through an opening formed in the tubular column 2 so as to be accessible to the vehicle driver.

At the inner end of the actuating body 49 is a radially inwardly projecting finger 53 having a flat upper surface 54. At the outer or opposite end of the body 49 is a flat surface 25 which parallels the surface 54. Between the surfaces 54 and 55 is an inclined cam surface 56. The end of the operating member 34 which confronts the actuating member 48 has an inner, rounded surface 57 and an outer, inclined cam surface 58 the inclination of which corresponds to the inclination of the cam surface 56.

The construction and arrangement of the operating member 34 and the actuating member 48 are such that, movement of the actuator body 48 radially inwardly toward the shaft 1 effects engagement of the cam surfaces 56 and 58 and vertical displacement of the operating member 34 and the switching member 38 so as to cause the latter to bridge all of the fixed contacts 41–45. Such movement of the operator 34 will cause the spring 46 to be compressed between the flange 37 of the switching member and the end wall 47 so as forcibly to bias the operator 34 to its normal or inactive position shown in FIGURE 2. When the actuator body 49 is moved to its radially innermost position, however, as is indicated in FIGURE 5, the flat surface 55 will be in engagement with the rounded surface 57 of the operator 34. In these positions of the parts, the operator 34 will be latched in its second or operating position. The surfaces 55 and 57, therefore, may be considered cooperable latch means. Inward movement of the member 48 is limited by a wall 56a of the casing 34.

The fixed contacts 41 and 42 are connected to the signaling indicators 5 and 6, respectively, and the contacts 43 and 44 are connected to the signaling indicators 7 and 8, respectively. The fixed contact 46 is connected to the vehicle battery B through a flasher unit 59. When the operating member 34 is in the operative position shown in FIGURE 2, in which the switching member 38 bridges all of the contacts 41–46, all of the signaling indicators 5, 6, 7 and 8 will flash simultaneously so as to provide a warning to drivers of approaching vehicles of a hazardous condition.

The switching member 38 will remain in its operative position as long as the actuator 48 is in its operative position. The hazard warning signal may be canceled manually by the vehicle driver's grasping the stud 52 and pulling it radially outwardly so as to remove the latch surface 55 from engagement with the latch surface 57, whereupon the spring 46 will restore the operating member 34 and the switching member 38 to their disable or inactive positions. Outward movement of the member 48 is limited by a wall member 48a of the casing 34.

Most jurisdictions have laws which declare it to be illegal to operate a motor vehicle on a highway with all four signaling indicators flashing simultaneously. Accordingly, it is preferred that the hazard warning signal be cancelable automatically when the vehicle is being driven. Apparatus constructed in accordance with the invention includes automatically concelable mechanism designated generally by the reference character 60 and comprises an operating instrumentality or body 61 mounted in a housing 62 for reciprocating movements radially of the steering shaft 1. The housing 62 preferably includes a cover 63 that is secured to the support 12 by screws 64 or the like and which overlies the body 61. The body has an opening 65 therein through which extends a finger 66 having a generally conical nose 67 which is adapted to be projected into the path of rotation of the cams 29. The body 61 constantly is urged to a retracted or radially outer position by means of a compression spring 68 that is accommodated in a slot 69 formed in the finger 66 and reacting between the body 61 and the housing 62.

The mechanism 60 includes motion transmitting means 70 for transmitting motion between the actuating means 48 and the conceling body 61. The motion transmitting means comprises an elongated rod 71 having a substantially square cross-sectional shank 72 that is slidably carried in the bore 35 of the operating member 34 and having a generally circular cross-sectional stem 73 that projects through the end wall 47 of the casing 32 and into a bore 74 formed in the support 12 and which communicates with the interior of the housing 62. The lower end of the rod 71 is provided with an inclined latch release surface 75, the inclination of which corresponds substantially to the inclination of the cam surface 56. The upper end of the rod 71 also is provided with an inclined surface 76 which corresponds to the inclination of an inclined cam surface 77 provided at the rear or radially outer end of the body 61.

The construction and arrangement of the motion transmission means are such that, movement of the actuating member 48 radially inwardly from its disabled or inactive position to its operating position effects engagement of the cam surfaces 56 and 75 so as to cause vertical displacement of the rod 71 upwardly toward the canceling instrumentality 61. As the rod 71 moves upwardly, the cam surface 76 will engage the cam surface 77 and effect movement of the body 61 radially inwardly so as to project the nose 67 of the finger 66 into the path of rotation of the cam 29. With the parts 34 and 49 in their latched positions, the cam surface 75 at the lower end of the rod 71 overlies the cam surface 56 on the actuator body 49 and is maintained in engagement therewith by the spring 68, but the capacity of the spring 68 is insufficient to exert sufficient force on the rod 71 to force movement of the body 49 in a direction to unlatch the surfaces 55 and 57. Thus, the latching surfaces 53 and 57 of the members 48 and 34, respectively, serve to maintain the cancelling finger 66 in its projected position.

As long as there is no rotation of the steering shaft 1, the canceling finger 66 will remain in a projected position in the path of rotation of the cams 29. Upon rotation of the steering shaft 1 in either direction from the position shown in FIGURE 3, however, one of the cams 29 will engage the conical nose 67 and exert a force on the finger 66 urging it to its retracted position within the housing 62. The force exerted on the finger 66 will be transmitted via the body 61 to the rod 71 so as to cause the latter to move downwardly. As the rod 71 moves downwardly, the inclined surface 75 will engage the cam surface 56 on the actuator body 49 and initiate movement of the latter toward its inactive position. Once the body 49 has moved a distance sufficient to effect disengagement of the latch surfaces 55 and 57, the spring 46 will restore the actuator body 49 to its fully projected or inactive position.

In the assembly of the apparatus with the vehicle steering mechanism, it is preferable that one of the cams 29 be so located as to be in a position to engage the canceling finger 66 whenever the steering shaft is oriented for straight line movement of the vehicle. Thus, it will not be possible for all four signaling indicators to be actuated simultaneously when the vehicle is under way. However, either the left-hand set of signaling indicators or the right-hand set of signaling indicators can be operated independently of each other by operation of the direction signaling apparatus 10.

When the apparatus is assembled in the manner indicated, the housing 4 may be adjusted axially of the column 2 without interference with the actuating member 48, and it is not necessary to provide an axial slot in the housing 4 to accommodate the actuating member 52.

The disclosed embodiment is representative of the presently preferred form of the invention, but is intended to be illustrative rather than definitive thereof. The invention is defined in the claims.

What is claimed is:

1. A switch construction comprising a casing; fixed contacts supported by said casing; an operating member reciprocable in said casing along a path between first and second positions; switch means carried by said operating member for engagement with and disengagement from said fixed contacts in response to such movement of said operating member; an actuating member engageable with said operating member; means mounting said actuating member for movement transversely of said in a direction to effect movement of said operating member to said second position; an instrumentality to be operated; motion transmitting means interconnecting said actuating member and said instrumentality; and means mounting said instrumentality in the path of movement of said motion transmitting means for movement in one direction thereby in response to said movement of said actuating member.

2. The construction set forth in claim 1 including cooperable latch means on said actuating member and said operating member for releasably latching said operating member in said second position.

3. The construction set forth in claim 2 including means on said motion transmitting means engageable with said actuating member for releasing said latch means in response to movement of said instrumentality in a direction opposite to said one direction.

4. The construction set forth in claim 3 including spring means acting on said operating member for biasing the latter constantly to said first position.

5. A switch construction comprising a casing; fixed contacts on said casing; an operating member slideably mounted in said casing for movements along a path; an actuating member slideably mounted in said casing for movements laterally of said path relatively to said operating member and engageable with the latter in response to movement of actuating member in one direction, engagement of said members in response to movement of said actuating member in said one direction effecting movement of said operating member along said path from a first position to a second position; latch means on said members engageable in response to movement of said operating member to said second position for maintaining said operating member in said second position; latch release means movable along said path for releasing said latch means; and switch means carried by said operating member for engagement with and disengagement from said fixed contacts in response to movement of said operating member between said positions.

6. The construction set forth in claim 5 including spring means acting on said operating member and constantly urging the latter toward said first position.

7. The construction set forth in claim 5 wherein said latch release means is engageable with said actuating member.

8. The construction set forth in claim 7 including means for moving said latch release means into engagement with said actuating member.

9. The construction set forth in claim 5 wherein said latch release means is carried by said operating member.

10. The construction set forth in claim 5 wherein said latch release means comprises an elongated rod extending through said operating member, one end of said rod being engageable with said actuating member and the other end of said rod terminating beyond said operating member.

11. The construction set forth in claim 10 including body means engageable with said other end of said rod; and means mounting said body means for movement toward and away from said rod.

12. The construction set forth in claim 11 wherein said body means is mounted for movement transversely of the longitudinal axis of said rod.

13. In a vehicle having left-hand and right-hand signals and steering means rotatable about an axis for turning said vehicle selectively to the left or to the right: signaling apparatus comprising operating switch means movable substantially parallel to said axis from a non-operating position to an operating position in which said left-hand and right-hand signals are operable simultaneously; actuating means movable transversely of said axis for moving said operating means to said second position; latch means reacting between said actuating means and said operating means for releasably maintaining the latter in said operating position; and latch release means responsive to rotation of said steering means to effect release of said latch means.

14. Apparatus as set forth in claim 13 including biasing means constantly acting on said operating means and biasing the latter toward said non-operating position.

15. Apparatus as set forth in claim 13 wherein said latch release means is engageable with said actuating means.

16. Apparatus as set forth in claim 15 including second operating means for operating said release means and means mounting said second operating means for movement toward and away from said steering means.

17. Apparatus as set forth in claim 16 wherein said steering means includes can means rotatable therewith in a path, and wherein said second operating means is moveable into the path of said cam means.

References Cited

UNITED STATES PATENTS

| 2,751,470 | 6/1956 | Bissonnette | 200—153 |
| 2,886,670 | 5/1959 | Dillon | 200—116 |

BERNARD A. GILHEANY, Primary Examiner

ROBERT COHRS, Assistant Examiner

U.S. Cl. X.R.

200—61.34